United States Patent
Shibata

(10) Patent No.: US 8,724,186 B2
(45) Date of Patent: May 13, 2014

(54) IMAGE READING DEVICE FOR READING DOCUMENT IMAGE AND IMAGE FORMING APPARATUS INCLUDING SAME

(71) Applicant: Kyocera Document Solutions Inc., Osaka (JP)

(72) Inventor: Naoki Shibata, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/771,205

(22) Filed: Feb. 20, 2013

(65) Prior Publication Data

US 2013/0215477 A1 Aug. 22, 2013

(30) Foreign Application Priority Data

Feb. 21, 2012 (JP) .................................. 2012-035169

(51) Int. Cl.
*H04N 1/04* (2006.01)

(52) U.S. Cl.
USPC ............ 358/474; 358/497; 358/501; 399/367

(58) Field of Classification Search
CPC ......... H04N 1/12; H04N 1/1017; H04N 1/93; H04N 1/1135; H04N 2201/0456; H04N 1/103; H04N 1/04729; H04N 1/04791; H04N 1/0018; H04N 1/00588; H04N 1/0411; H04N 1/28; H04N 1/043; G03G 15/00; G02B 26/084
USPC ......... 358/474, 501, 505, 497, 486, 496, 1, 9, 358/494; 399/367, 380
See application file for complete search history.

(56) References Cited

U.S. PATENT DOCUMENTS

| | | | | |
|---|---|---|---|---|
| 4,486,786 A | * | 12/1984 | Sato et al. | 358/497 |
| 4,761,561 A | * | 8/1988 | Fujiwara et al. | 250/548 |
| 5,737,089 A | * | 4/1998 | Kameyama | 358/296 |
| 6,594,037 B1 | * | 7/2003 | Takahashi | 358/474 |
| 7,733,540 B2 | * | 6/2010 | Moribe | 358/474 |
| 7,804,625 B2 | * | 9/2010 | Osakabe | 358/474 |
| 8,422,093 B2 | * | 4/2013 | Ishida | 358/475 |
| 8,482,815 B2 | * | 7/2013 | Ikeno et al. | 358/474 |
| 8,599,450 B2 | * | 12/2013 | Kubo et al. | 358/498 |
| 2006/0092481 A1 | * | 5/2006 | Nakano et al. | 358/474 |

FOREIGN PATENT DOCUMENTS

JP 2007-28487 2/2007

* cited by examiner

*Primary Examiner* — Negussie Worku

(74) *Attorney, Agent, or Firm* — Gerald E. Hespos; Michael J. Porco; Matthew T. Hespos

(57) ABSTRACT

An image reading device includes a case, a reading section, an engaging section, a guide section, a first deformation characteristic section, and a second deformation characteristic section. The case includes a bottom plate. The reading section moves in a sub-scanning direction. The guide section guides movement of the reading section. When the bottom plate is divided into a first region and a second region with the guide section as a boundary, the first deformation characteristic section is arranged in the first region, and has a deformation characteristic such that the first deformation characteristic section deforms with respect to heat in a first direction that is perpendicular to the bottom plate. The second deformation characteristic section is arranged in the second region, and has a deformation characteristic such that the second deformation characteristic section deforms with respect to heat in a second direction which is opposite to the first direction.

16 Claims, 10 Drawing Sheets

IMAGE READING DEVICE FOR READING DOCUMENT IMAGE AND IMAGE FORMING APPARATUS INCLUDING SAME

This application is based upon and claims the benefit of priority from Japanese Patent Application No. 2012-035169 filed in Japanese Patent Office on Feb. 21, 2012, the entire contents of which are incorporated herein by reference.

BACKGROUND

The present disclosure relates to an image reading device for reading a document image and an image forming apparatus including such an image reading device.

As a reading system of an image reading device, a document fixing reading system is known. In the document fixing reading system, an original document is placed on a contact glass, pressed against the contact glass by a platen mat or the like, and scanned by a reading unit, whereby a document image is read.

As an image reading device employing the document fixing reading system, conventionally, an image reading device explained below is known. In this image reading device, a contact image sensor (CIS) extended in a main scanning direction is arranged below a contact glass as a reading unit. The image sensor is moved in a sub-scanning direction, whereby an original document on the contact glass is two-dimensionally scanned. A guide member extending in the sub-scanning direction is provided on a bottom plate of a housing. A slider is arranged in a lower part of the image sensor. The slider slides along the guide member to move in the sub-scanning direction.

However, in the image reading device, when the bottom plate of the housing is deformed by the influence of heat, the guide member provided on the bottom plate is displaced up and down. When the guide member is displaced up and down, the image sensor guided by the guide member moves up and down. In this case, the distance between the original document on the contact glass and the image sensor changes. Then, an inconvenience occurs in that an image read by the image sensor is defocused and reading quality of a document image is deteriorated. In particular, since the contact image sensor has a narrow focusing range, defocus due to thermal deformation of the housing tends to occur. As a result, the quality of a read image is sometimes substantially deteriorated.

It is an object of the present disclosure to provide an image reading device that can reduce the likelihood that the distance between an image reading section configured to read an image and an original document fluctuates because of the influence of heat and an image forming apparatus including the image reading device.

SUMMARY

An image reading device according to an aspect of the present disclosure includes a document plate, a case, a reading section, an engaging section, a guide section, a first deformation characteristic section, and a second deformation characteristic section. An original document is placed on an upper surface of the document plate. The case includes a bottom plate, which is a bottom section, and supports the document plate. The reading section is arranged so as to extend in a main scanning direction in the case, can move in a sub-scanning direction in the case, and is configured to read an image of the original document. The engaging section is disposed on a surface of the reading section opposed to the bottom plate. The guide section is extended in the sub-scanning direction on the bottom plate to be opposed to the engaging section, and configured to engage with the engaging section to thereby guide linear movement of the reading section in the sub-scanning direction. When the bottom plate is divided into a first region and a second region with the guide section as a boundary, the first deformation characteristic section is arranged in the first region, and has a deformation characteristic such that the first deformation characteristic section deforms with respect to heat in a first direction that is perpendicular to the bottom plate. The second deformation characteristic section is arranged in the second region, and has a deformation characteristic such that the second deformation characteristic section deforms with respect to heat in a second direction which is opposite to the first direction and perpendicular to the bottom plate.

An image forming apparatus according to another aspect of the present disclosure includes an image forming section, a main body housing, the image reading device, a paper discharge tray, a discharging section, and wall sections. The image forming section forms an image on a sheet. The main body housing houses the image forming section. The image reading device is arranged in an upper part of the main body housing. The paper discharge tray is arranged on an upper surface of the main body housing to be spaced apart from and opposed to the bottom plate, which is a lower surface of the image reading section, and is configured to receive the sheet. The discharging section discharges the sheet having the image formed thereon by the image forming section, to the paper discharge tray. The wall sections form, in one direction that is an extension direction of the main scanning direction in a discharge space that is a space between the bottom plate and the paper discharge tray, an opening section for enabling the sheet in the discharge space to be taken out to the outside of the discharge space, and are configured to surround other directions. The second deformation characteristic section is located in a position closer to the opening section than the first deformation characteristic section. A cavity of the second deformation characteristic section is extended to the opening section.

DETAILED DESCRIPTION

Figure 1:
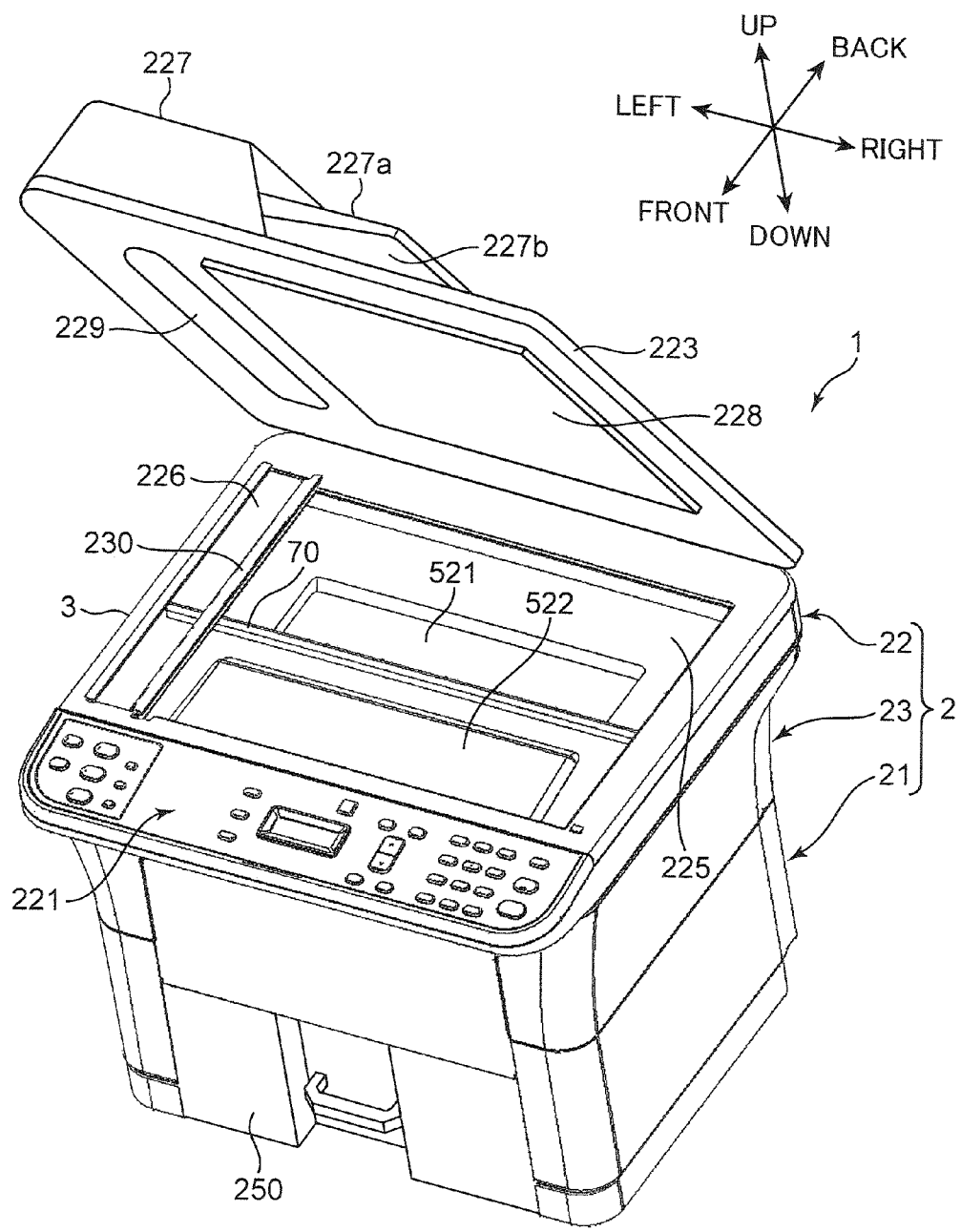
FIG. 1 is a perspective view showing an example of an image forming apparatus including an image reading device according to an embodiment of the present disclosure.

An embodiment of the present disclosure is explained below with reference to the drawings. In the figures, components denoted by the same reference numerals and signs indicate the same components and explanation of the components is omitted.

Figure 2:
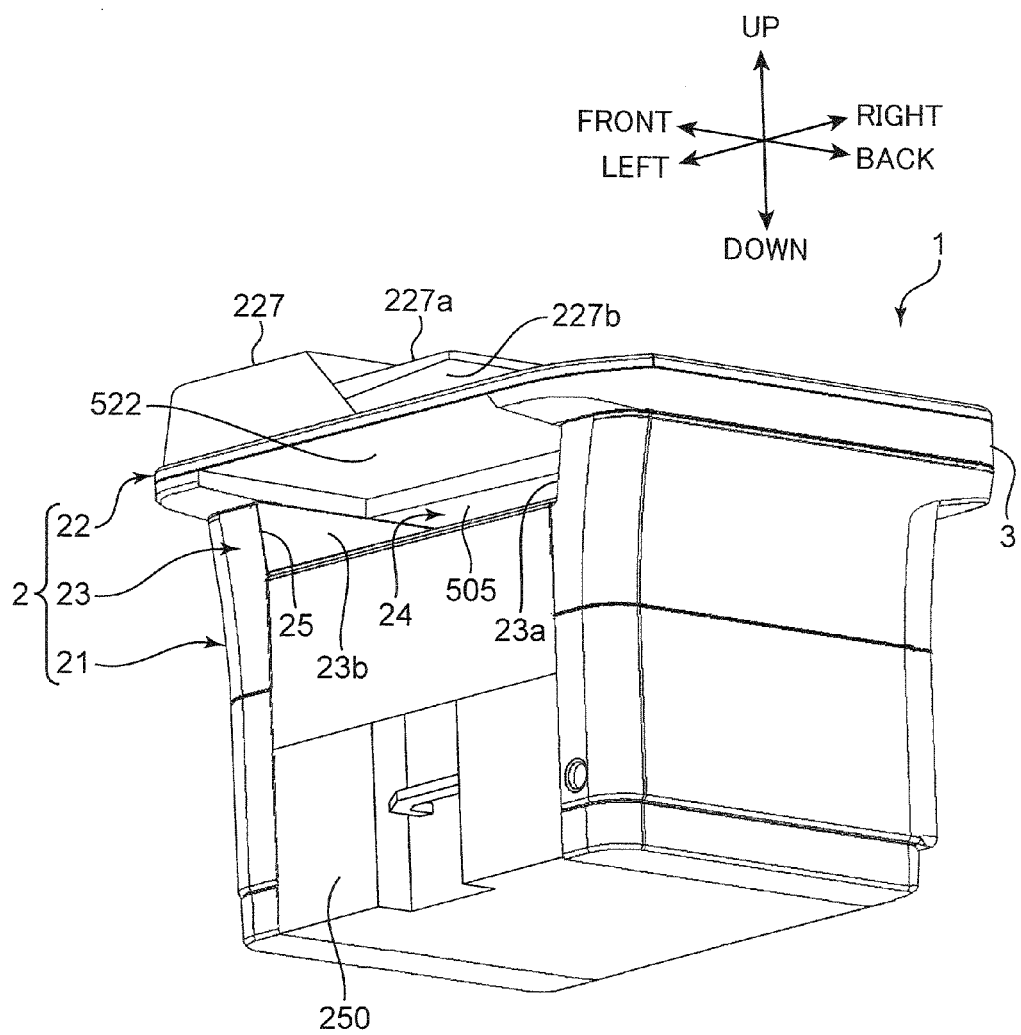
FIG. 2 is a perspective view of the image forming apparatus shown in FIG. 1 viewed from obliquely below.
Figure 3:
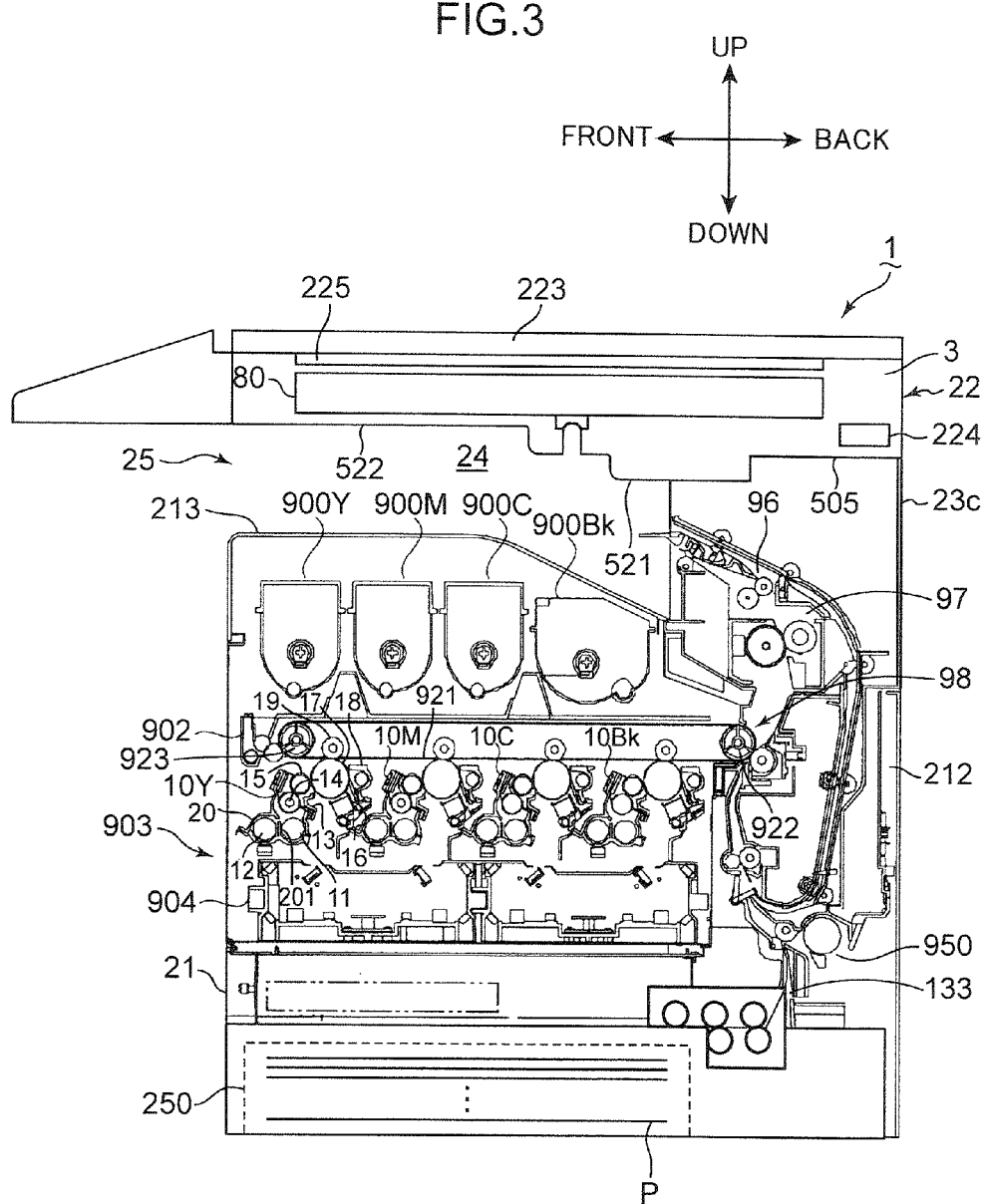
FIG. 3 is an explanatory diagram schematically showing the internal structure of the image forming apparatus shown in FIG. 1.

FIG. 1 is a perspective view showing an example of an image forming apparatus including an image reading device according to the present disclosure. FIG. 1 is a perspective view of the image forming apparatus viewed from obliquely above. FIG. 2 is a perspective view of the image forming apparatus shown in FIG. 1 viewed from obliquely below. FIG. 3 is an explanatory diagram schematically showing the internal structure of the image forming apparatus shown in FIG. 1. The image forming apparatus shown in FIGS. 1 to 3 is a copying machine of a so-called internal paper-ejection type. However, in other embodiments, the image forming apparatus may be a printer, a facsimile apparatus, a multifunction peripheral including the functions of the printer and the facsimile apparatus, and other apparatuses for forming a toner image on a sheet.

An image forming apparatus 1 includes a main case 2 having a substantially rectangular parallelepiped shape. The main case 2 includes a lower case 21 (a main body housing) having a substantially rectangular parallelepiped shape, an upper case 22 having a substantially rectangular parallelepiped shape disposed above the lower case 21, and a connecting case 23 configured to connect the lower case 21 and the upper case 22. The connecting case 23 includes a right wall 23a (a wall section) extending along the right edge of the main case 2, a left wall 23b (a wall section) extending along the left edge of the main case 2, and a rear surface wall 23c (a wall section) extending along the rear surface edge of the main case 2. A sheet subjected to printing processing is discharged to a discharge space 24 surrounded by an upper surface of the lower case 21, the lower surface (a bottom plate 505) of the upper case 22, and the connecting case 23. The upper surface of the lower case 21 is formed as a paper discharge tray 213 arranged to be spaced apart from and opposed to the lower surface of the upper case 22 and configured to receive a the sheet.

The discharge space 24 is opened to the outer space by an opening section 25 surrounded by the lower surface of the upper case 22, the upper front edge portion of the lower case 21, the front edge portion of the right wall 23a, and the front edge portion of the left wall 23b. The opening section 25 is oriented to the front, which is an extension direction of a main scanning direction for scanning of an original document by an image reading device 3 explained below. A user can insert a hand into the discharge space 24 from the opening section 25 and take out the sheet discharged to the discharge space 24 to the front.

An operation panel 221 is provided in the upper case 22. The operation panel 221 is disposed to project to the front surface direction of the upper case 22. The operation panel 221 includes, for example, a liquid crystal display and key switches and receives an input of information concerning image formation processing. The user can input the number of sheets to be printed and the like and input printing density and the like by operating the operation panel 221.

A document cover 223 is disposed on the upper case 22. At the rear end of the document cover 223, the document cover 223 is pivotably attached to the upper rear end of the upper case 22. This makes it possible to open the front end side of the document cover 223 upward. A pressing plate 228 for pressing an original document placed on a contact glass 225 explained below is disposed in a position of the lower surface of the document cover 223 opposed to the contact glass 225. A slit 229 elongated in the main scanning direction is formed in a position of the lower surface of the document cover 223 opposed to a DP reading window 226 explained below.

An auto document feeder (ADF) 227 is disposed in an upper part of the document cover 223. The ADF 227 includes a document tray 227a on which an original document bundle is placed and a document discharge section 227b to which an original document, an image of which is read, is discharged. The ADF 227 causes an original document plated on the document tray 227a to pass on the upper side of the slit 229 and discharges the original document to the document discharge section 227b.

An image reading device 3 is disposed in the upper case 22. The image reading device 3 includes a contact glass 225 (a document plate), a document feeder (DP) reading window 226, a document guide plate 230, a CIS unit 80 (a reading section), and an image processing unit 224. FIG. 1 shows the inside of the image reading device 3 seen through the contact glass 225. However, the illustration of the CIS unit 80 is omitted.

The contact glass 225 includes an upper surface on which an original document is placed. The upper surface is opposed to the lower surface (a document surface) of a fixed original document manually placed by the user. The upper surface is used as a reading surface when an image of the fixed original document is read. A document guide plate 230 for guiding the original document is attached in the vicinity of the left end of the contact glass 225. The DP reading window 226 is a glass window elongated in the front back direction. When the original document conveyed by the ADF 227 passes the upper side of the slit 229, the DP reading window 226 is used as a reading surface for reading an image of the original document that passes through the slit 229. The contact glass 225 and the DP reading window 226 are formed by one glass plate and supported by the upper case 22. The document guide plate 230 is stuck to a boundary position between the contact glass 225 and the DP reading window 226. The contact glass 225 and the DP reading window 226 are partitioned by the document guide plate 230.

The CIS unit 80 optically reads a document image of a document sheet. The CIS unit 80 has a bar-like (substantially rectangular parallelepiped-like) shape elongated in the main scanning direction (the front back direction). The CIS unit 80 includes not-shown LED light sources, graded-index (GRIN) lenses, and contact image sensor (CIS). Reflected light from an original document illuminated by the LED light sources is made incident on light-receiving surfaces of the CIS, on which image pickup elements are linearly disposed, via the GRIN lenses arranged in an array shape. The CIS photoelectrically convert the reflected light, whereby an image of the original document is read. Analog image data of the document image photoelectrically converted by the CIS is sent to the image processing unit 224 after being digitally converted. After executing various kinds of image processing on the image data according to a reading condition of the document image, the image processing unit 224 sends the image data after the processing to an exposing unit 904 explained below.

After pivoting the document cover 223 upward to open the document cover 223 with the rear end of the document cover 223 as a fulcrum, the user places an original document on the contact glass 225 on the upper case 22. Thereafter, the user can operate the operation panel 221 and cause the image reading device 3 disposed in the upper case 22 to read an image of the original document. Further, the user can place an original document bundle on the document tray 227a in a state in which the document cover 223 is closed, operate the operation panel 221, and cause the ADF 227 to feed an original document to thereby cause the image reading device 3 to read an image of the original document.

A sheet tray 250 on which a plurality of sheets P are stacked is disposed in the lower case 21. The sheet tray 250 can be drawn out to the front from the lower case 21. The sheet P stored in the sheet tray 250 is delivered upward in the lower case 21, subjected to image formation processing in the lower case 21 on the basis of an instruction input by the user through the operation panel 221, and discharged to the paper discharge tray 213 in the discharge space 24.

The lower case 21 houses various devices for forming an image on the sheet P. The connecting case 23 houses various devices for discharging the sheet P subjected to the image formation processing to the discharge space 24.

In the lower case 21, a toner container 900Y for yellow, a toner container 900M for magenta, a toner container 900C for cyan, a toner container 900Bk for black, an intermediate transfer unit 902, an image forming unit 903, an exposing unit 904, a fixing unit 97, and a paper discharging unit 96 (a discharging section) are housed. The intermediate transfer unit 902, the image forming unit 903, the exposing unit 904, and the fixing unit 97 are equivalent to an example of an image forming section configured to form an image on a sheet.

The image forming unit 903 includes developing devices 10Y, 10M, 10C, and 10Bk corresponding to colors Y, M, C, and Bk. The developing devices 10Y, 10M, 10C, and 10Bk are respectively disposed below the toner containers 900Y, 900M, 900C, and 900Bk.

The image forming unit 903 includes a plurality of photosensitive drums 17, a plurality of charging devices 16, a plurality of developing devices 10 (10Y, 10M, 10C, and 10Bk), a plurality of transfer rollers 19, and a plurality of cleaning devices 18 corresponding to the respective colors. As the photosensitive drums 17, for example, photosensitive drums formed of an amorphous silicon (a-Si) material can be used.

The charging devices 16, the developing devices 10 (10Y, 10M, 10C, and 10Bk), the transfer rollers 19, and the cleaning devices 18 are arranged around the photosensitive drums 17 along a rotating direction of the photosensitive drums 17. The charging devices 16 uniformly charge the surfaces of the photosensitive drums 17. The surfaces of the photosensitive drums 17 after the charging are exposed to light by the exposing unit 904 and electrostatic latent images are formed on the surfaces. The exposing unit 904 irradiates a laser beam on the basis of a digital signal generated by the image processing unit 224. The developing devices 10Y, 10M, 10C, and 10Bk supply toners to the circumferential surfaces of the respective photosensitive drums 17 and develop (visualize) the electrostatic latent images formed on the circumferential surfaces. Toners of the respective colors are supplied to the developing devices 10Y, 10M, 10C, and 10Bk respectively from the toner containers 900Y, 900M, 900C, and 900Bk. The transfer rollers 19 form nip sections between the transfer rollers 19 and the photosensitive drums 17 across an intermediate transfer belt 921 and primarily transfer toner images on the photosensitive drums 17 onto the intermediate transfer belt 921. The cleaning devices 18 clean the circumferential surfaces of the photosensitive drums 17 after the toner image transfer.

Each of the developing devices 10Y, 10M, 10C, and 10Bk includes a development case 20. A two-component developer including a magnetic carrier and a toner is stored in the development case 20. In the development case 20, two agitating rollers 11 and 12 are rotatably arranged in parallel in the vicinity of the bottom section of the development case 20 with the longitudinal direction set as an axis direction.

A circulation path of the developer is set on the inner bottom surface of the development case 20. The agitating rollers 11 and 12 are disposed in the circulation path. In the axis direction between the agitating rollers 11 and 12, a partition wall 201 erected from the bottom section of the development case 20 is provided. The partition wall 201 partitions the circulation path. The circulation path is formed to turn around the partition wall 201. The two-component developer is charged while being agitated and conveyed in the circulation path by the agitating rollers 11 and 12.

The two-component developer circulates in the development case 20 while being agitated by the agitating rollers 11 and 12, whereby the toner is charged. The two-component developer on the agitating roller 11 is attracted and conveyed by a magnetic roller 14 located on the upper side. The attracted two-component developer forms a magnetic brush (not shown in the figure) on the magnetic roller 14. The thickness of the magnetic brush is regulated by a doctor blade 13. The magnetic brush supplies to the toner to a developing roller 15 above the magnetic roller 14. A toner layer on the developing roller 15 is formed by a potential difference between the magnetic roller 14 and the developing roller 15. The electrostatic latent image on the photosensitive drum 17 is developed by the toner layer.

The exposing unit 904 includes various optical devices such as a light source, a polygon mirror, a reflecting mirror, and a deflecting mirror. The exposing unit 904 irradiates light based on image data on the circumferential surface of the photosensitive drums 17 provided in the image forming unit 903 and forms an electrostatic image.

The intermediate transfer unit 902 includes an intermediate transfer belt 921, a driving roller 922, and a driven roller 923. Toner images are transferred onto the intermediate transfer belt 921 from the plurality of photosensitive drums 17 to be superimposed one on top of another (primary transfer). The superimposed toner images are secondarily transferred onto a sheet supplied from the sheet tray 250 (see FIG. 1) in a secondary transfer section 98. The driving roller 922 and the driven roller 923 that drive the intermediate transfer belt 921 to turn are rotatably supported by the lower case 21.

The fixing unit 97 heats the toner images on the sheet secondarily transferred from the intermediate transfer unit 902 to thereby fix the toner images on the sheet. The sheet having a color toner image fixed thereon is discharged to the paper discharging unit 96 formed in an upper part of the fixing unit 97 (in the connecting case 23).

The paper discharging unit 96 discharges the sheet, which is conveyed from the fixing unit 97, to the upper surface of the lower case 21 used as the paper discharge tray 213.

<Basic Configuration of the Image Reading Device 3>

Figure 4:
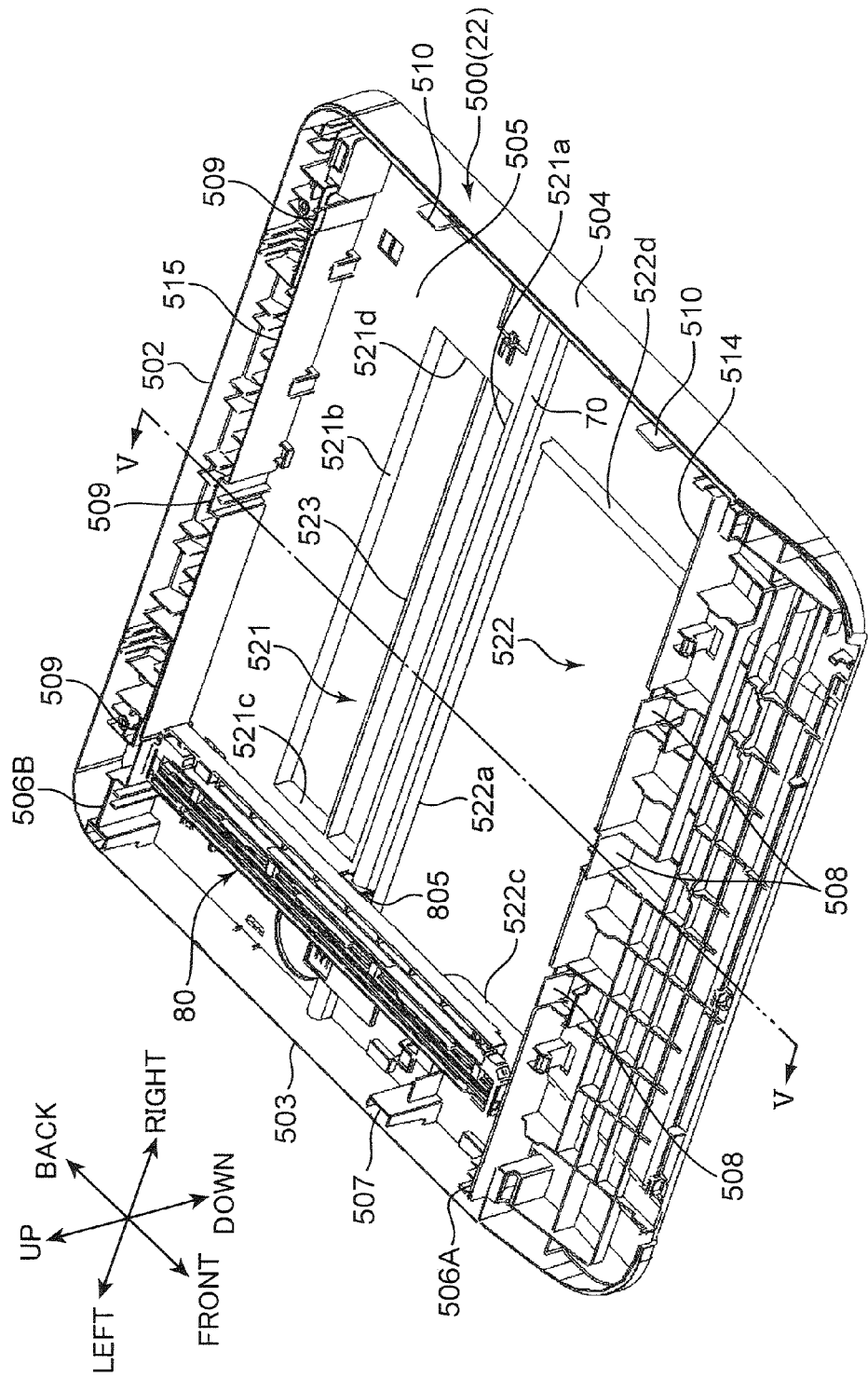
FIG. 4 is a perspective view of the image reading device according to the embodiment of the present disclosure.
Figure 5:
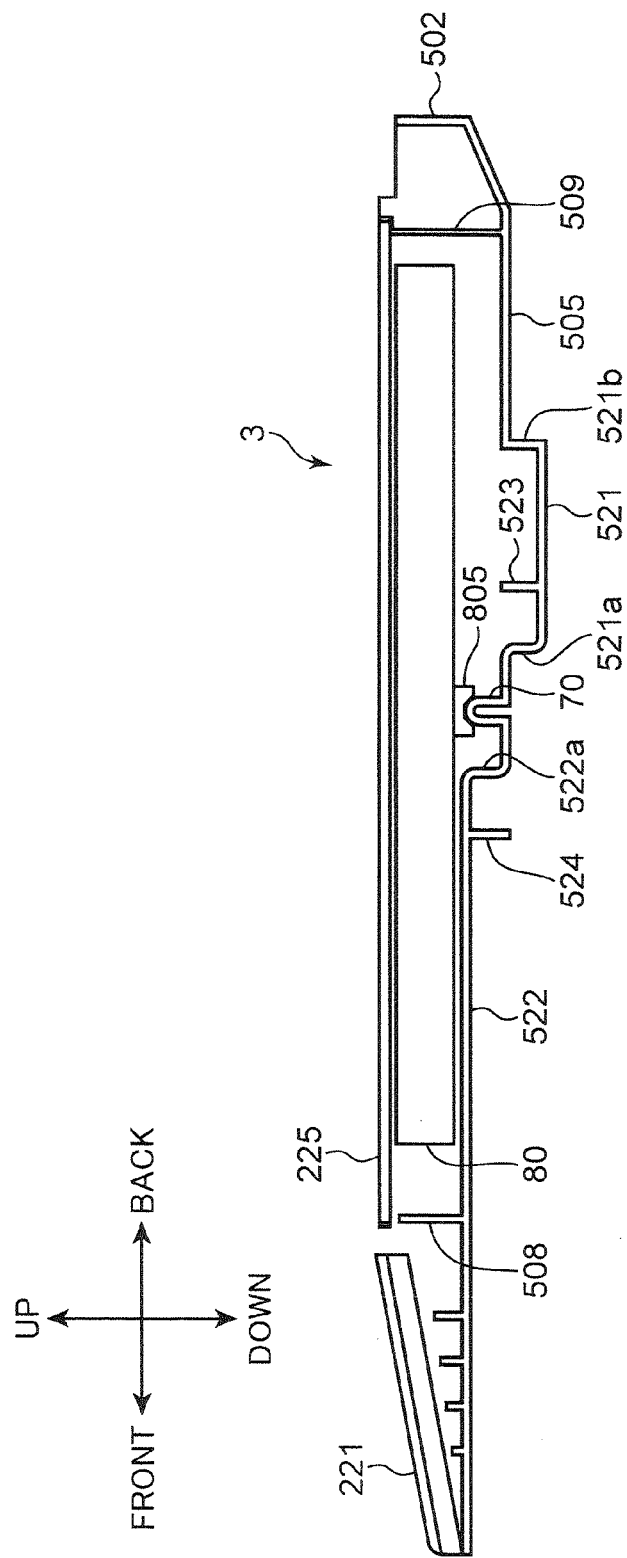
FIG. 5 is a sectional view of the image reading device taken along line V-V shown in FIG. 4 in a state in which a CIS unit is located in the position of line V-V.

Details of the image reading device 3 according to this embodiment are explained. FIG. 4 is a perspective view of the image reading device 3 according to this embodiment. FIG. 4 shows the image reading device 3 in a state in which the contact glass 225, the DP reading window 226, and a cover frame that holds the contact glass 225 and the DP reading window 226 arranged on the upper surface of the image reading device 3 are removed. FIG. 5 is a sectional view taken along line V-V in FIG. 4 in a state in which the CIS unit 80 is moved to a position of line V-V.

The image reading device 3 includes a housing 500 (a case), which is a part of the upper case 22. The housing 500 includes a rear wall 502, a left wall 503, a right wall 504, and a bottom plate 505. The rear wall 502 is a wall section erected behind the image reading device 3. The left wall 503 and the right wall 504 are a pair of wall sections erected to be opposed to each other in a sub-scanning direction (the left right direction) of the image reading device 3. The fronts of the left wall 503 and the right wall 504 are obliquely inclined such that the height of the walls decreases toward the distal ends of the walls. The operation panel 221 is disposed to be obliquely inclined in the upper parts in the vicinity of the distal ends in the fronts of the left wall 503 and the right wall 504.

The bottom plate 505 is a bottom section of the housing 500 (the image reading device 3). The bottom plate 505 connects the rear wall 502, the left wall 503, and the right wall 504 under the walls. In this embodiment, the housing 500 is formed of a resin material and formed by integral molding. The housing 500 houses the CIS unit 80 and the like on the inside and supports the contact glass 225 arranged on the upper surface from below.

The housing 500 further includes an eleventh supporting section 506A, a twelfth supporting section 506B, a first side supporting section 507, front supporting sections 508, rear supporting sections 509, second side supporting sections 510, a front intermediate wall 514, a rear intermediate wall 515, and a guide section 70.

The eleventh supporting section 506A and the twelfth supporting section 506B are a pair of erected walls erected from the front and rear ends of the bottom plate 505 to be opposed to each other at the left end of the image reading device 3. The first side supporting section 507 is an erected wall erected from the bottom plate 505 in parallel to the left wall 503 in the vicinity on the inner side of the left wall 503 between the eleventh supporting section 506A and the twelfth supporting section 506B. The left side end of the glass plate forming the contact glass 225 and the DP reading window 226 is supported by the eleventh supporting section 506A, the twelfth supporting section 506B, and the first side supporting section 507.

The front supporting sections 508 are erected walls erected from the bottom plate 505 in three places in the front of the housing 500 and behind the operation panel 221. Similarly, the rear supporting sections 509 are erected walls erected from the bottom plate 505 in three places on the inner side of the rear wall 502. The front and rear ends of the glass plate forming the contact glass 225 and the DP reading window 226 are supported by the front supporting sections 508 and the rear supporting sections 509. The front intermediate wall 514 is erected slightly behind the front supporting sections 508. The rear intermediate wall 515 is erected slightly in front of the rear supporting sections 509.

The second side supporting sections 510 are erected walls erected from the bottom plate 505 in parallel to the right wall 504 in two places in the vicinity on the inner side of the right wall 504. The right side end of the contact glass 225 is supported by the second side supporting sections 510.

As explained above, in this embodiment, the contact glass 225 is supported from below by the plurality of erected walls erected from the bottom plate 505 of the housing 500. Therefore, the height dimensions of the plurality of erected walls are set with high accuracy.

The guide section 70 is protruded from the bottom plate 505 upward extending from the inner side of the left wall 503 to the inner side of the right wall 504 substantially in the center of the main scanning direction of the bottom plate 505. The guide section 70 is a convex ridge extending in the left right direction (the sub-scanning direction) on the bottom plate 505. The guide section 70 has a function of guiding liner movement in the sub-scanning direction of the CIS unit 80. The guide section 70 is formed of a resin material.

The CIS unit 80 (the reading section) is disposed to extend in the main scanning direction in the internal space of the housing 500. That is, the CIS unit 80 has a case shape that is long in the array direction of the image pickup elements of the CIS. The CIS unit 80 is disposed in the housing 500 such that the longitudinal direction thereof and the main scanning direction coincide with each other. An engaging section 805 is provided in a lower part of the CIS unit 80.

The engaging section 805 is disposed on the lower surface of the CIS unit 80 in the center in the main scanning direction of the CIS unit 80. In this embodiment, the engaging section 805 is protruded downward from the lower surface of the CIS unit 80. The engaging section 805 engages with the guide section 70, whereby the position of the CIS unit 80 is determined.

On the bottom plate 505, a concave section 521 (a first deformation characteristic section) and a convex section 522 (a second deformation characteristic section) are formed. The concave section 521 is a concave section recessed such that the upper surface (the surface opposed to the contact glass 225) of the bottom plate 505 hollows downward. The bottom plate 505 includes a portion protruded to the lower surface side by the recessing of the concave section 521. The convex section 522 is a convex section protruded to project upward from the upper surface of the bottom plate 505. In the bottom plate 505, a cavity is formed on the lower surface side by the protrusion of the convex section 522. When the bottom plate 505 is divided into the front and the back with the guide section 70 as a boundary, the concave section 521 is located behind the guide section 70 (a first region) and the convex section 522 is located in front of the guide section 70 (a second region).

The concave section 521 includes a pair of sidewall sections 521a and 521b extending in parallel to the guide section 70 (the sub-scanning direction) and a pair of sidewall sections 521c and 521b extending in the direction perpendicular to the guide section 70 (the main scanning direction). In the bottom section of the concave section 521, a first reinforcing plate 523 is erected to extend in parallel to the guide section 70.

The convex section 522 includes a sidewall section 522a extending in parallel to the guide section 70 (the sub-scanning direction) and a pair of sidewall sections 522c and 522d extending in the direction perpendicular to the guide section 70 (the main scanning direction). As shown in FIG. 5, the sidewall sections 522c and 522d are extended to the front end of the housing 500, i.e., the convex section 522 is extended to the opening section 25. On the lower surface of the bottom plate 505, in the bottom section of the convex section 522, a second reinforcing plate 524 is erected to extend in parallel to the guide section 70.

The length in the sub-scanning direction of the sidewall sections 521a, 521b, and 522a (the width in the sub-scanning direction of the concave section 521 and the convex section 522) is about 70% of the length in the sub-scanning direction of the bottom plate 505.

The concave section 521 has a deformation characteristic that, when temperature rises, the bottom surface of the concave section 521 thermally expands, whereby the concave section 521 is deformed to project downward (in a first direction) with respect to the bottom plate 505, which is a plane extending in the horizontal direction. The convex section 522 has a deformation characteristic that, when temperature rises, the top plate section of the convex section 522 thermally expands, whereby the convex section 522 projects upward (in a second direction) with respect to the bottom plate 505. That is, in the concave section 521 and the convex section 522, the deformation characteristics with respect to heat in the direction perpendicular to the bottom plate 505 are in directions opposite to each other.

Figure 6:
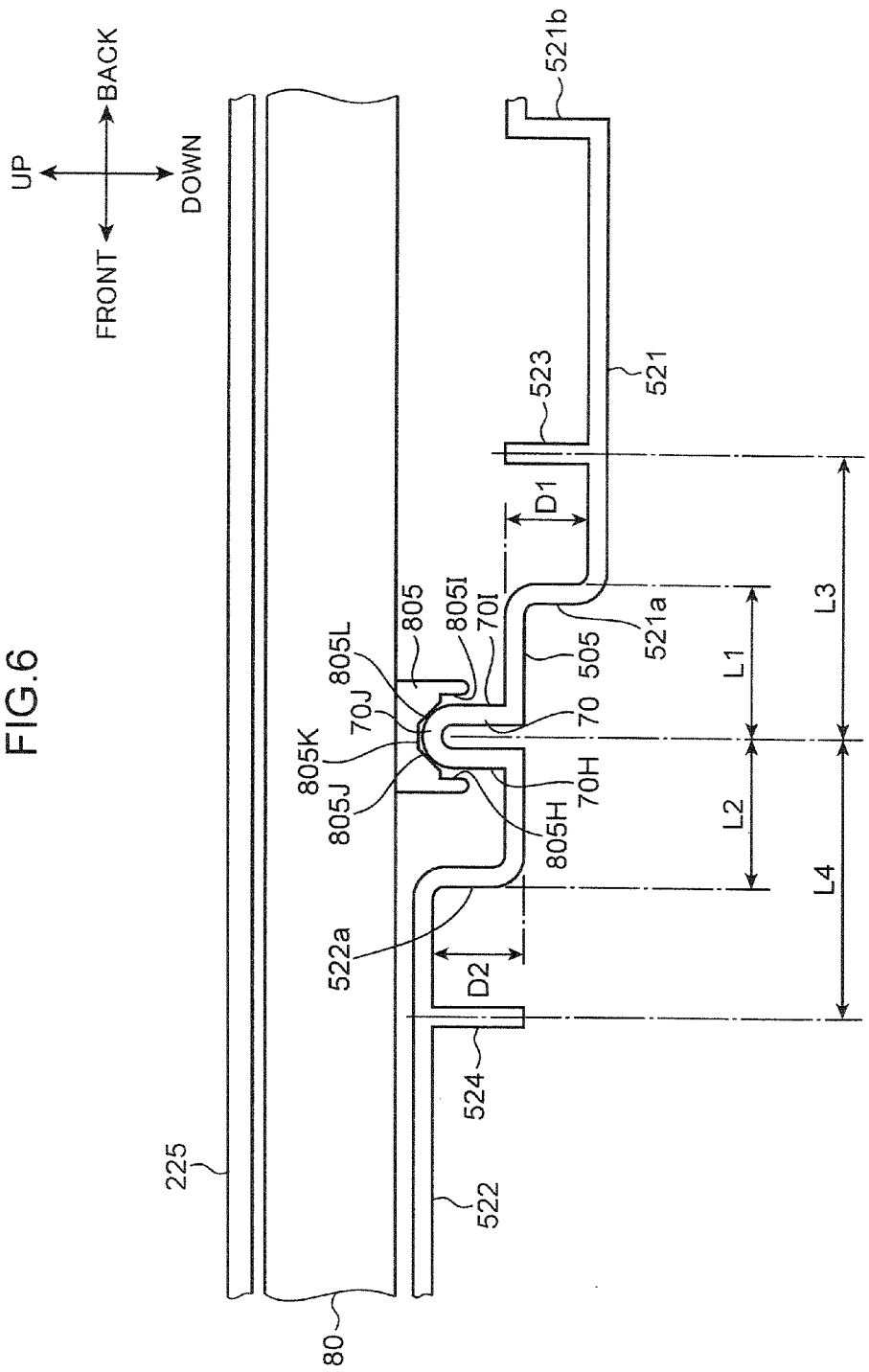
FIG. 6 is an enlarged diagram of the vicinity of a guide section and an engaging section shown in FIG. 5.

FIG. 6 is an enlarged diagram of the vicinity of the guide section 70 and the engaging section 805 shown in FIG. 5. In FIG. 6, the guide section 70 is a concave ridge section including a front surface section 70H, a rear surface section 70I, and a distal end section 70J. The front surface section 70H and the rear surface section 70I are respectively wall sections erected vertically upward from the bottom plate 505. The distal end section 70J connects the front surface section 70H and the rear surface section 70I above the front surface section 70H and the rear surface section 70I. The distal end section 70J has a semicircular shape in sectional view in the main scanning direction.

The engaging section 805 is a concave ridge section hollowed vertically upward. The engaging section 805 includes a first wall section 805H, a second wall section 805I, a first slope 805J, an upper wall 805K, and a second slope 805L. The first wall section 805H and the second wall section 805I are a pair of wall sections that define the position in the front back direction of the engaging section 805. The first slope 805J and the second slope 805L are respectively disposed above the first wall section 805H and the second wall section 805I and on the inner side of the engaging section 805. The first slope 805J and the second slope 805L are disposed to face each other at an angle of about 45 degrees with respect to the horizontal direction. The upper wall 805K connects the first slope 805J and the second slope 805L on the upper end sides of the first slope 805J and the second slope 805L.

In the configuration explained above, the positions in the front back direction and the up down direction of the CIS unit 80 are determined by the engagement of the engaging section 805 and the guide section 70. That is, the CIS unit 80 is disposed on the bottom plate 505 such that the engaging section 805 engages with the guide section 70. The first slope 805J and the second slope 805L come into contact with the circumferential surface of the distal end section 70J of the guide section 70. Since the first slope 805J and the second slope 805L are disposed to incline at about 45 degrees to face each other, the positions in the front back direction and the up down direction of the guide section 70 are determined.

In such a configuration, the housing 500 formed by resin molding is sometimes deformed by a rise in the outdoor temperature and heat generated in the apparatus. If the concave section 521 and the convex section 522 are not formed on the bottom plate 505 and the bottom plate 505 has a flat shape as a whole, the bottom plate 505 is often deformed to be curved such that the center of the bottom plate 505 project downward.

When the deformation of the bottom plate 505 explained above occurs, in FIG. 6, the bottom plate 505 is displaced downward. According to the displacement, the guide section 70 disposed on the bottom plate 505 moves downward. Therefore, the CIS unit 80, the position in the up down direction of which is determined by the distal end section 70J, also moves downward. As a result, the CIS unit 80 moves away from the contact glass 225 and the DP reading window 226 arranged above the CIS unit 80. In this case, a reading distance, which is the distance between an original document placed on the contact glass 225 and the CIS unit 80 or the distance between an original document passing on the DP reading window 226 and the CIS unit 80, changes and distortion or defocus occurs in a read image. In particular, the CIS unit 80 has small depth of field compared with a CCD sensor. Therefore, the influence of fluctuation in the reading distance on the read image is large. As explained above, when the bottom plate 505 has a flat shape, if the housing 500 is thermally deformed, a problem occurs in that the distance between the CIS unit 80 and the contact glass 225 or the DP reading window 226, i.e., the distance between the CIS unit 80 and the original document fluctuates.

Therefore, in the image reading device 3 according to this embodiment, the concave section 521 and the convex section 522 are formed on the bottom plate 505, whereby the fluctuation in the distance between the CIS unit 80 and the contact glass 225 due to the influence of the heat is reduced.

Figure 7:
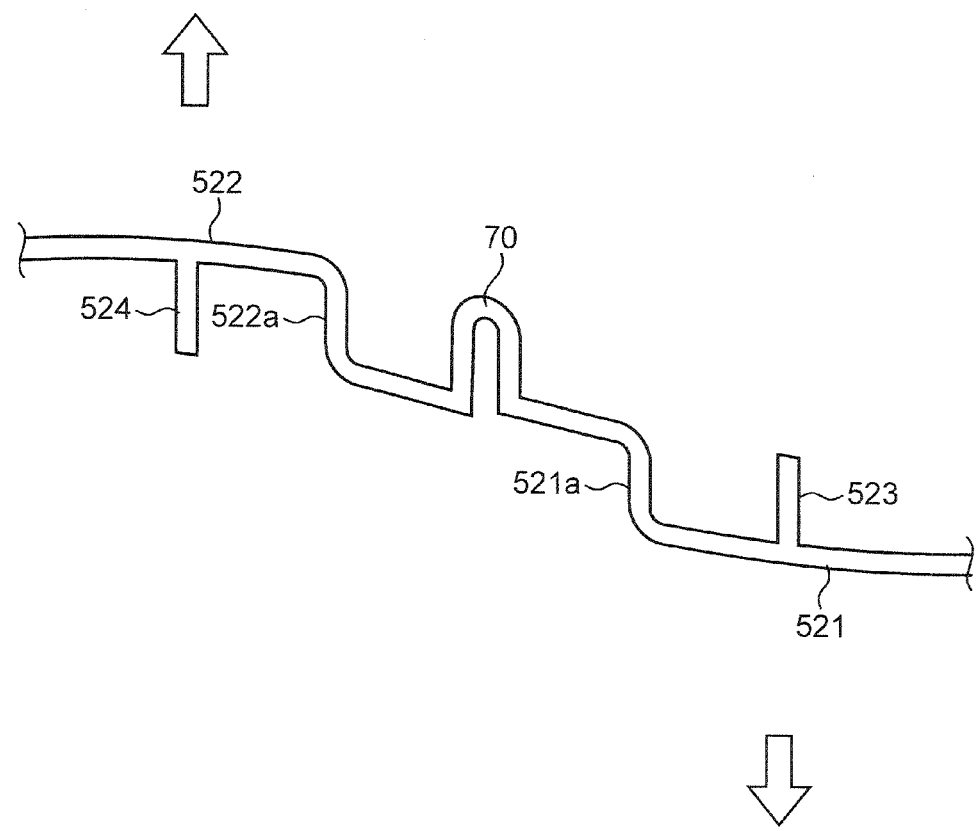
FIG. 7 is an explanatory diagram for explaining an influence on the guide section of deformation of a housing (a bottom plate) due to heat.

FIG. 7 is an explanatory diagram for explaining the influence of the guide section 70 that occurs when the housing 500 (the bottom plate 505) is deformed by heat. In FIG. 7, to facilitate understanding, a degree of the deformation of the bottom plate 505 due to heat is exaggerated. When heat is applied to the concave section 521, the concave section 521 is deformed to swell in the downward direction and is about to push the guide section 70 in the downward direction. On the other hand, when heat is applied to the convex section 522, the convex section 522 is deformed to swell in the upward direction and is about to push the guide section 70 in the upward direction.

Therefore, forces in directions opposite to each other act on the guide section 70. As a result, the force generated by the thermal deformation of the concave section 521 and the force generated by the thermal deformation of the convex section 522 are offset. Therefore, the position of the guide section 70 is not moved in the up down direction and is maintained in a position substantially the same as a position where the guide section 70 is present when the housing 500 is not thermally deformed. As a result, the influence of the thermal deformation of the housing 500 on a reading distance of an original document is reduced and the likelihood that deformation or defocus occurs in a read image is reduced.

In the example explained in the embodiment, with width in the sub-scanning direction of the concave section 521 and the convex section 522 is about 70% of the length in the sub-scanning direction of the bottom plate 505. If the width in the sub-scanning direction of the concave section 521 and the convex section 522 is equal to or larger than a half of the length in the sub-scanning direction of the bottom plate 505, it is possible to markedly reduce the influence of the thermal deformation of the housing 500 on a reading distance of an original document.

In the concave section 521, the sidewall sections 521a and 521b are disposed in parallel to the guide section 70. The sidewall sections 521c and 521d are disposed in the direction perpendicular to the guide section 70. Consequently, a deforming direction in the thermal deformation of the concave section 521 is regulated in both the directions parallel to and perpendicular to the guide section 70. As a result, a force in a torsion direction is suppressed from being applied to the guide section 70. The deforming direction of the concave section 521 is regulated in a direction substantially perpendicular to the bottom plate 505.

On the other hand, in the convex portion 522, the sidewall section 522a is disposed in parallel to the guide section 70 and the sidewall sections 522c and 522d are disposed in the direction perpendicular to the guide section 70. Consequently, the deforming direction of the thermal deformation of the convex section 522 is regulated in both the directions parallel to and perpendicular to the guide section 70. As a result, a force in the torsion direction is suppressed from being applied to the guide section 70. The deforming direction of the convex section 522 is regulated in the direction substantially perpendicular to the bottom plate 505.

As a result, both of the direction of the force applied to the guide section 70 by the thermal deformation of the concave section 521 and the direction of the force applied to the guide section 70 by the thermal deformation of the convex section 522 are the direction perpendicular to the bottom plate 505 and directions opposite to each other. Consequently, accuracy of offsetting the force generated by the thermal deformation of the concave section 521 and the force generated by the thermal deformation of the convex section 522 is improved.

As shown in FIG. 6, a distance L1 from the center in the front back direction of the guide section 70 to a wall surface of the sidewall section 521*a* facing the inner side of the concave section 521 and a distance L2 from the center in the front back direction of the guide section 70 to a wall surface of the sidewall section 522*a* facing the inner side of the concave section formed on the lower surface side of the convex section 522 are substantially equal.

Consequently, the magnitude of the force in the downward direction applied to the guide section 70 by the thermal deformation of the concave section 521 and the magnitude of the force in the upward direction applied to the guide section 70 by the thermal deformation of the convex section 522 are generally balanced. As a result, the accuracy of offsetting the force generated by the thermal deformation of the concave section 521 and the force generated by the thermal deformation of the convex section 522 is improved.

When the sidewall sections 521*a* and 522*a* are not linearly formed in parallel to the guide section 70, a shortest distance from the center in the front back direction of the guide section 70 to the wall surface of the sidewall section 521*a* facing the inner side of the concave section 521 may be set as the distance L1 and a shortest distance from the center in the front back direction of the guide section 70 to the wall surface of the sidewall section 522*a* facing the inner side of the concave section formed on the lower surface side of the convex section 522 may be set as the distance L2.

The distance L1 is equivalent to an example of a shortest distance of a distance from the guide section to the first deformation characteristic section. The distance L2 is equivalent to an example of a shortest distance of a distance from the guide section to the second deformation characteristic section.

Depth D1 in the concave section 521 from the upper surface of the bottom plate 505 and depth D2 (depth of the cavity) in the convex section 222 from the lower surface of the bottom plate 505 are substantially equal. The depth D1 and the height in the convex section 522 from the upper surface of the bottom plate 505 may be substantially equal.

Consequently, the magnitude of the force in the downward direction applied to the guide section 70 by the thermal deformation of the concave section 521 and the magnitude of the force in the upward direction applied to the guide section 70 by the thermal deformation of the convex section 522 are generally balanced. As a result, the accuracy of offsetting the force generated by the thermal deformation of the concave section 521 and the force generated by the thermal deformation of the convex section 522 is improved.

The rigidity of the bottom plate 505 is improved by a first reinforcing plate 523 erected on the bottom section of the concave section 521 and a second reinforcing plate 524 erected on the bottom section on the lower surface side of the convex section 522. As a result, a thermal deformation amount of the bottom plate 505 is reduced.

In addition, the first reinforcing plate 523 and the second reinforcing plate 524 are erected to extend in parallel to the guide section 70. Therefore, the deforming directions in the thermal deformation of the concave section 521 and the convex section 522 are regulated in the direction parallel to the guide section 70. As a result, the likelihood that the force in the torsion direction is applied to the guide section 70 is reduced. Therefore, the accuracy of offsetting the force generated by the thermal deformation of the concave section 521 and the force generated by the thermal deformation of the convex section 522 is improved.

A distance L3 from the center in the front back direction of the guide section 70 to the first reinforcing plate 523 and a distance L4 from the center in the front back direction of the guide section 70 to the second reinforcing plate 524 are substantially equal. Consequently, the effect of reducing the force in the torsion direction acting on the guide section 70 is substantially equal on both the sides of the guide section 70. As a result, the accuracy of offsetting the force generated by the thermal deformation of the concave section 521 and the force generated by the thermal deformation of the convex section 522 is improved.

If a plurality of the first reinforcing plates 523 and a plurality of the second reinforcing plates 524 are provided, it is possible to increase the rigidity of the bottom plate 505 and reduce the thermal deformation amount of the bottom plate 505. Further, the effect of reducing the force in the torsion direction acting on the guide section 70 is increased. In this case, it is desirable that the number of the first reinforcing plates 523 and the number of the second reinforcing plates 524 are equal. Since the number of the first reinforcing plates 523 and the number of the second reinforcing plates 524 are equal, the effect of reducing the force in the torsion direction acting on the guide section 70 is equal on both the sides of the guide section 70. As a result, the accuracy of offsetting the force generated by the thermal deformation of the concave section 521 and the force generated by the thermal deformation of the convex section 522 is improved.

The sidewall sections 521*a*, 521*b*, and 522*a*, the first reinforcing plates 523, and the second reinforcing plates 524 do not always have to be parallel to the guide section 70. The sidewall sections 521*c*, 521*d*, 522*c*, and 522*d* do not always have to be perpendicular to the guide section 70. The distance L1 and the distance L2 do not always have to be equal. The depth D1 and the depth D2 do not always have to be equal. The distance L3 and the distance L4 do not always have to be equal. The number of the first reinforcing plates 523 and the number of the second reinforcing plates 524 do not always have to be equal.

The concave section 521 (the first deformation characteristic section) does not always need to project on the lower surface side of the bottom plate 505 and may be recessed within the thickness of the bottom plate 505. The convex section 522 (the second deformation characteristic section) does not always need to project on the upper surface side of the bottom plate 505 and may be recessed to the lower surface side within the thickness of the bottom plate 505.

However, if the concave section 521 is projected on the lower surface side of the bottom plate 505 and the convex section 522 is projected on the upper surface side of the bottom plate 505, the sidewall sections 521*a*, 521*b*, 521*c*, 521*d*, 522*a*, 522*c*, and 522*d* can be erected from the bottom plate 505. With the erected sidewall sections, it is possible to increase the rigidity of the bottom plate 505 and reduce the thermal deformation amount of the bottom plate 505 and increase the effect of regulating the deforming directions due to the thermal deformation of the concave section 521 and the convex section 522. As a result, the accuracy of offsetting the force generated by the thermal deformation of the concave section 521 and the force generated by the thermal deformation of the convex section 522 is improved.

The first deformation characteristic section and the second deformation characteristic section do not always have to be the concave section and the convex section as long as directions of deformation caused perpendicularly to the bottom plate 505 with respect to heat are opposite to each other. For example, instead of the concave section 521, the lower surface of the bottom plate 505 may project downward like the lower surface side of the concave section 521 while the upper surface of the bottom plate 505 is kept flat and, instead of the convex section 522, the upper surface of the bottom plate 505 may project upward like the upper surface side of the convex section 522 while the lower surface of the bottom plate 505 is kept flat.

With such a configuration, likewise, the force generated by the thermal deformation of the concave section 521 and the force generated by the thermal deformation of the convex section 522 are offset and the influence of the thermal deformation of the housing 500 on a reading distance of an original document is reduced.

In this embodiment, the convex section 522 is located in front of the guide section 70 and the convex section 522 is extended to the opening section 25. Therefore, as shown in FIGS. 2 and 3, the bottom plate 505 is hollow in the vicinity of the opening section 25 viewed from the lower surface side of the convex section 522. As a result, since the opening section 25 is expanded, the user can easily insert a hand into the discharge space 24 from the opening section 25 and take out the sheet P in the discharge space 24.

The sheet P having an image formed thereon is hot because the sheet P is discharged to the paper discharge tray 213 in the discharge space 24 immediately after the sheet P is heated by the fixing unit 97. Therefore, the discharge space 24 tends to be filled with the heat of the sheet P. If the discharge space 24 is filled with the heat, the image reading device 3 arranged in the upper part of the discharge space 24 is heated and the housing 500 causes thermal deformation. However, since the convex section 522 is extended to the opening section 25 and the opening section 25 is expanded, the heat in the discharge space 24 is easily discharged from the opening 25. As a result, the likelihood that the housing 500 causes thermal deformation with the heat of the sheet P is reduced.

The concave section 521 may be located in front of the guide section 70 and the convex section 522 may be located behind the guide section 70. Even in this case, the effect of reducing the influence of the thermal deformation of the housing 500 on a reading distance of an original document is obtained.

Figure 8:
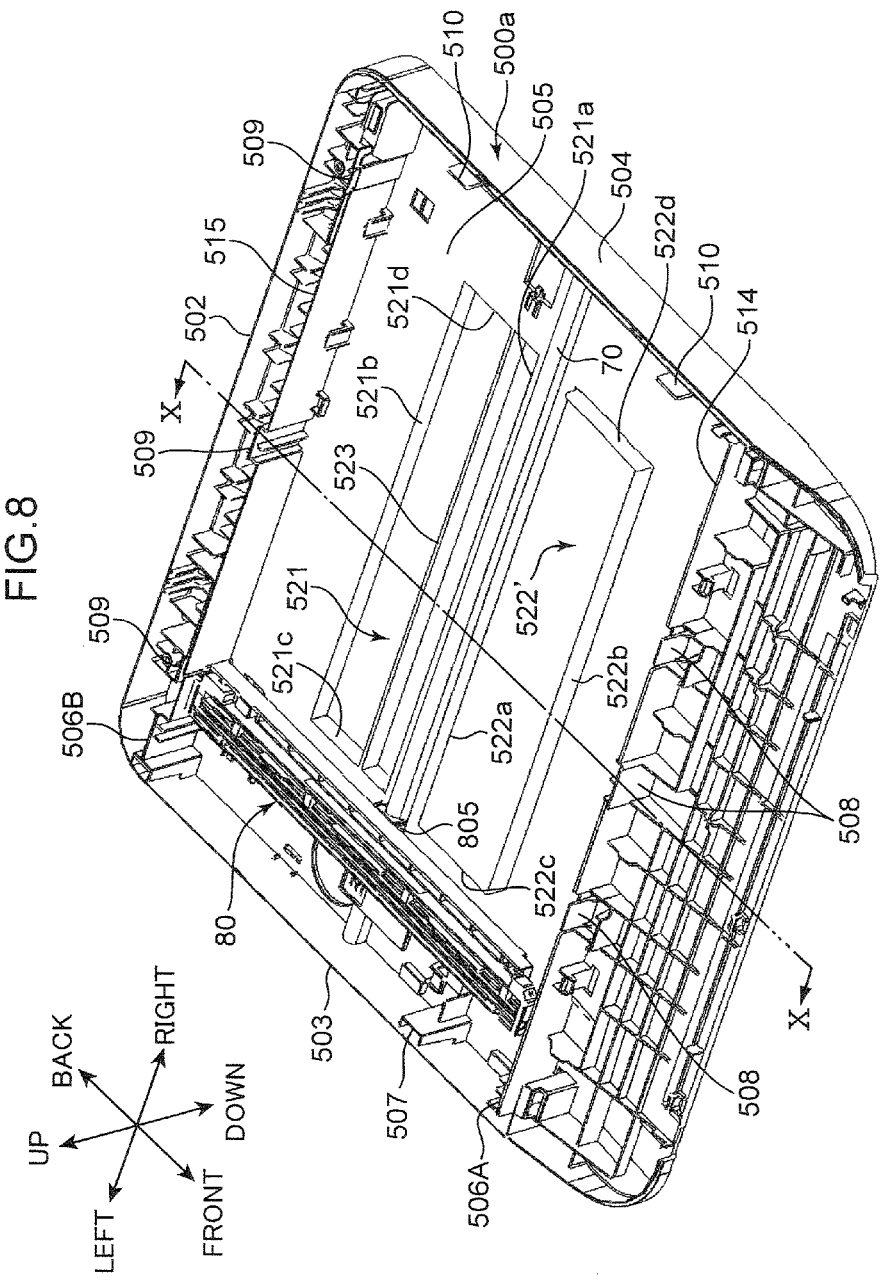
FIG. 8 is a perspective view showing another example of the image reading device shown in FIG. 4.
Figure 9:
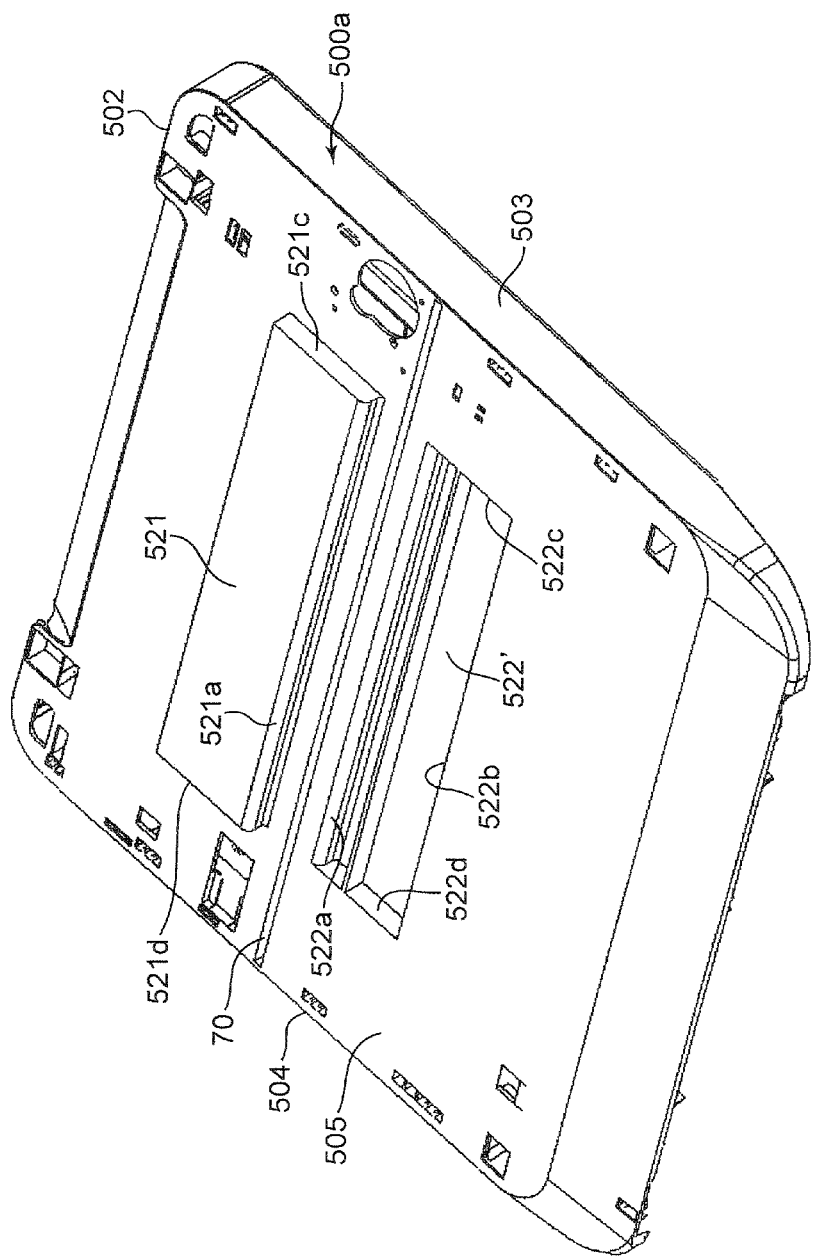
FIG. 9 is a perspective view of the housing of the image reading device shown in FIG. 8 viewed from the bottom surface side.
Figure 10:
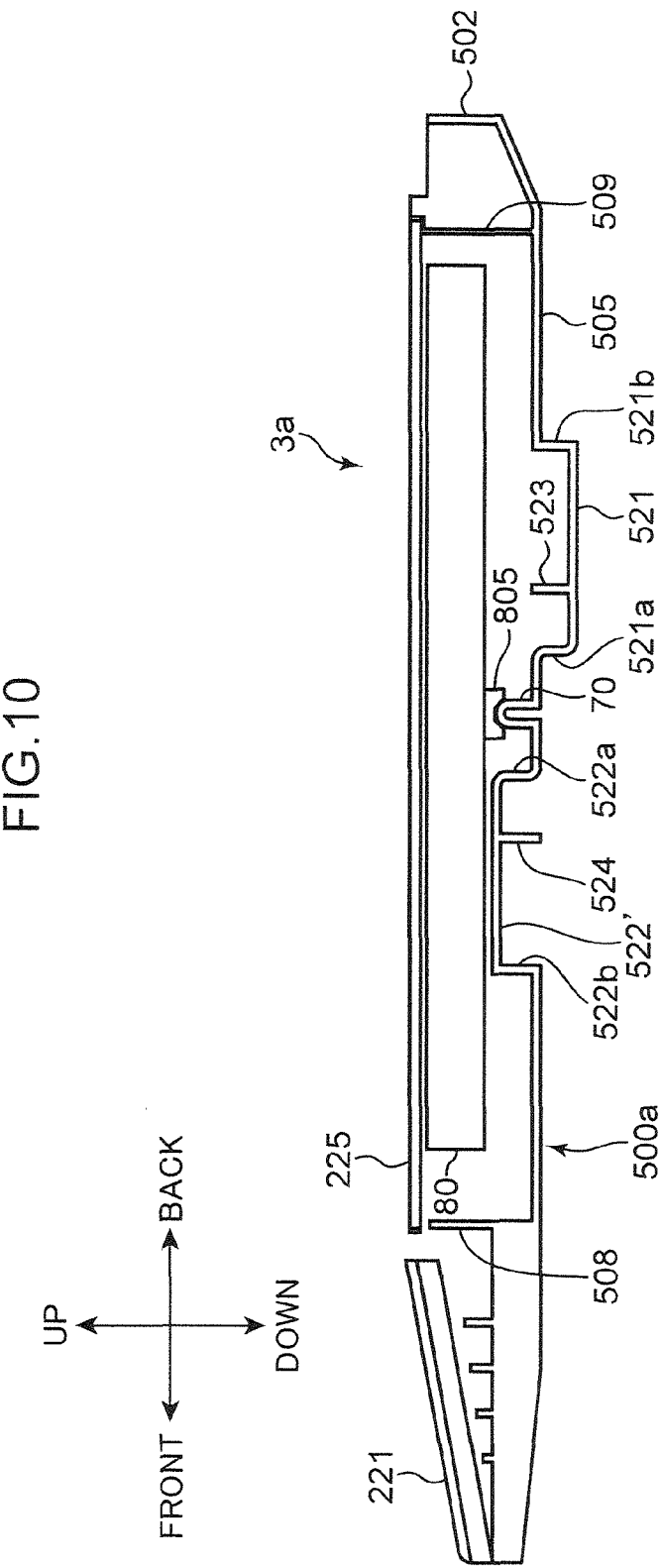
FIG. 10 is a sectional view of the image reading device shown in FIG. 8.

The convex section 522 does not always have to be extended to the opening section 25. FIG. 8 is a perspective view showing another example of the image reading device shown in FIG. 4. FIG. 9 is a perspective view of a housing 500a of the image reading device shown in FIG. 8 viewed from the lower surface side. FIG. 10 is a sectional view taken along line X-X in FIG. 8 and a sectional view in a state in which the CIS unit 80 is moved to the position of line X-X.

In the housing 500a (a case) shown in FIGS. 8, 9, and 10, a convex section 522' is not extended to the opening section 25. A sidewall section 522b erected on the upper surface of the bottom plate 505 is provided at the front end of the convex section 522'.

In the housing 500 shown in FIGS. 4 and 5, since the convex section 522 is extended to the opening section 25, a sidewall section extended in parallel to the guide section 70 is not formed in front of the convex section 522. Therefore, the convex section 522 includes only one sidewall section parallel to the guide section 70. On the other hand, since the concave section 521 includes the sidewall sections 521a and 521b parallel to the guide section 70, in the housing 500, the number of sidewall sections parallel to the guide section 70 is different in the concave section 521 and the convex section 522. Therefore, it is likely that a difference occurs between the force applied to the guide section 70 by the thermal deformation of the concave section 521 and the force applied to the guide section 70 by the thermal deformation of the convex section 522.

On the other hand, in the housing 500a shown in FIGS. 8, 9, and 10, the number of sidewall sections parallel to the guide section 70, i.e., the number of walls extending along the sub-scanning direction is equal in the concave section 521 and the convex section 522'. Therefore, the difference between the force applied to the guide section 70 by the thermal deformation of the concave section 521 and the force applied to the guide section 70 by the thermal deformation of the convex section 522' is reduced. As a result, the accuracy of offsetting the force generated by the thermal deformation of the concave section 521 and the force generated by the thermal deformation of the convex section 522' is improved.

In the examples explained above, the number of sidewall sections perpendicular to the guide section 70, i.e., the number of walls extending along the main scanning direction in the housing 500 (500a) is equal in the concave section 521 and the convex section 522 (522'). However, the number of walls extending along the main scanning direction may be different in the concave section 521 and the convex section 522 (522'). Nevertheless, if the number of walls extending along the main scanning direction is equal in the concave section 521 and the convex section 522 (522'), the accuracy of offsetting the force generated by the thermal deformation of the concave section 521 and the force generated by the thermal deformation of the convex section 522 (522') is improved.

The width of the concave section 521 in the direction perpendicular to the guide section 70 (the distance between the sidewall section 521a and the sidewall section 521b) and the width of the convex section 522' in the direction perpendicular to the guide section 70 (the distance between the sidewall section 522a and the sidewall section 522b) are desirably substantially equal. Consequently, the accuracy of offsetting the force generated by the thermal deformation of the concave section 521 and the force generated by the thermal deformation of the convex section 522' is improved.

The width of the concave section 521 in the direction parallel to the guide section 70 (the distance between the sidewall section 521c and the sidewall section 521d) and the width of the convex section 522' (522) in the direction parallel to the guide section 70 (the distance between the sidewall section 522c and the sidewall section 522d) are desirably substantially equal. Consequently, the accuracy of offsetting the force generated by the thermal deformation of the concave section 521 and the force generated by the thermal deformation of the convex section 522' (522) is improved.

The shape of the concave section 521 and the shape of the convex section 522' are desirably vertically symmetrical to each other. Consequently, the accuracy of offsetting the force generated by the thermal deformation of the concave section 521 and the force generated by the thermal deformation of the convex section 522' is improved.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image reading device comprising:
a document plate having an upper surface on which an original document is placed;
a case including a bottom plate, which is a bottom section, and configured to support the document plate;
a reading section that is arranged so as to extend in a main scanning direction in the case, can move in a sub-scanning direction in the case, and is configured to read an image of the original document;
an engaging section disposed on a surface of the reading section opposed to the bottom plate;
a guide section extended in the sub-scanning direction on the bottom plate to be opposed to the engaging section, and configured to engage with the engaging section to thereby guide linear movement of the reading section in the sub-scanning direction;
a first deformation characteristic section that is arranged in a first region when the bottom plate is divided into the first region and a second region with the guide section as a boundary, and that has a deformation characteristic such that the first deformation characteristic section deforms with respect to heat in a first direction that is perpendicular to the bottom plate; and
a second deformation characteristic section that is arranged in the second region, and that has a deformation characteristic such that the second deformation characteristic section deforms with respect to heat in a second direction which is opposite to the first direction and perpendicular to the bottom plate.

2. The image reading device according to claim 1, wherein the bottom plate is a flat plate-like body,
the first deformation characteristic section is a concave section recessed on a surface of the bottom plate opposed to the document plate, and
the second deformation characteristic section is a convex section protruded on the surface of the bottom plate opposed to the document plate.

3. The image reading device according to claim 2, wherein the bottom plate includes a portion protruded, by the recessing of the concave section, to a surface on an opposite side of the surface of the bottom plate opposed to the document plate, and
a cavity is formed, by the protrusion of the convex section, on the surface on the opposite side of the surface of the bottom plate opposed to the document plate.

4. The image reading device according to claim 3, wherein a depth of the concave section and a depth of the cavity of the second deformation characteristic section are substantially equal.

5. The image reading device according to claim 3, wherein the first deformation characteristic section includes a first reinforcing plate erected along the sub-scanning direction in a cavity of the concave section of the first deformation characteristic section, and
the second deformation characteristic section includes a second reinforcing plate erected along the sub-scanning direction in the cavity of the convex section of the second deformation characteristic section.

6. The image reading device according to claim 5, wherein the number of the first reinforcing plates and the number of the second reinforcing plates are equal.

7. The image reading device according to claim 5, wherein a distance from the guide section to the first reinforcing plate and a distance from the guide section to the second reinforcing plate are substantially equal.

8. An image forming apparatus comprising:
an image forming section configured to form an image on a sheet;
a main body housing configured to house the image forming section;
the image reading device according to claim 3 arranged in an upper part of the main body housing;
a paper discharge tray that is arranged on an upper surface of the main body housing to be spaced apart from and opposed to the bottom plate, which is a lower surface of the image reading section, and that is configured to receive the sheet;
a discharging section configured to discharge the sheet having the image formed thereon by the image forming section, to the paper discharge tray;
wall sections forming, in one direction that is an extension direction of the main scanning direction in a discharge space that is a space between the bottom plate and the paper discharge tray, an opening section for enabling the sheet in the discharge space to be taken out to an outside of the discharge space, and configured to surround other directions, wherein
the second deformation characteristic section is located in a position closer to the opening section than the first deformation characteristic section, and
the cavity of the second deformation characteristic section is extended to the opening section.

9. The image reading device according to claim 2, wherein a width of the concave section in the sub-scanning direction is equal to or larger than a half of a length of the bottom plate in the sub-scanning direction, and
a width of the convex section in the sub-scanning direction is equal to or larger than a half of the length of the bottom plate in the sub-scanning direction.

10. The image reading device according to claim 2, wherein a width of the concave section in the sub-scanning direction and a width of the convex section in the sub-scanning direction are substantially equal.

11. The image reading device according to claim 2, wherein
the first deformation characteristic section includes a wall extending along the main scanning direction and a wall extending along the sub-scanning direction, and
the second deformation characteristic section includes a wall extending along the main scanning direction and a wall extending along the sub-scanning direction.

12. The image reading device according to claim 11, wherein
the number of the walls extending along the main scanning direction of the first deformation characteristic section and the number of the walls extending along the main scanning direction of the second deformation characteristic section are equal, and
the number of the walls extending along the sub-scanning direction of the first deformation characteristic section and the number of the walls extending along the sub-scanning direction of the second deformation characteristic section are equal.

13. The image reading device according to claim 2, wherein a shape of the concave section and a shape of the convex section are vertically symmetrical to each other.

14. The image reading device according to claim 2, wherein a width of the concave section in the main scanning direction and a width of the convex section in the main scanning direction are substantially equal.

15. The image reading device according to claim 2, wherein a depth of the concave section and a height of the convex section are substantially equal.

16. The image reading device according to claim 1, wherein a shortest distance from the guide section to the first deformation characteristic section and a shortest distance from the guide section to the second deformation characteristic section are substantially equal.

* * * * *